(12) United States Patent
Ikäheimo et al.

(10) Patent No.: US 10,686,343 B2
(45) Date of Patent: Jun. 16, 2020

(54) ROTOR OF ELECTRIC MACHINE AND MANUFACTURING METHOD THEREOF

(71) Applicant: ABB Schweiz AG, Baden (CH)

(72) Inventors: Jouni Ikäheimo, Kurikka (FI); Tero Känsäkangas, Vaasa (FI); Jere Kolehmainen, Vaasa (FI)

(73) Assignee: ABB Schweiz AG, Baden (CH)

( * ) Notice: Subject to any disclaimer, the term of this patent is extended or adjusted under 35 U.S.C. 154(b) by 119 days.

(21) Appl. No.: 15/771,316

(22) PCT Filed: Jul. 1, 2016

(86) PCT No.: PCT/EP2016/065569
§ 371 (c)(1),
(2) Date: Apr. 27, 2018

(87) PCT Pub. No.: WO2017/071836
PCT Pub. Date: May 4, 2017

(65) Prior Publication Data
US 2018/0309336 A1    Oct. 25, 2018

(30) Foreign Application Priority Data
Oct. 27, 2015    (CN) .......................... 2015 1 0706454

(51) Int. Cl.
*H02K 1/28* (2006.01)
*H02K 1/24* (2006.01)
(Continued)

(52) U.S. Cl.
CPC ............... *H02K 1/28* (2013.01); *H02K 1/08* (2013.01); *H02K 1/246* (2013.01); *H02K 15/028* (2013.01); *H02K 2201/06* (2013.01)

(58) Field of Classification Search
CPC ............ H02K 1/28; H02K 1/24; H02K 15/02; H02K 1/08
(Continued)

(56) References Cited

U.S. PATENT DOCUMENTS 5,903,080 A      5/1999  Nashiki et al.
6,259,181 B1 *   7/2001  Kawano ................. H02K 1/246
                                                      310/162
(Continued)

FOREIGN PATENT DOCUMENTS

CN    1400725 A      3/2003
CN    102594064 A    7/2012
(Continued)

OTHER PUBLICATIONS

European Patent Office, International Search Report & Written Opinion issued in corresponding Application No. PCT/EP2016/065569, dated Oct. 26, 2016, 9 pp.
(Continued)

*Primary Examiner* — Hanh N Nguyen
(74) *Attorney, Agent, or Firm* — Taft Stettinius & Hollister LLP; J. Bruce Schelkopf

(57) ABSTRACT

A stack of a rotor comprises a plurality of stack elements which include material of first magnetic conductance. The rotor includes sectorial sections distributed round a rotational axis of the rotor. Each of the stack elements has an aperture of second magnetic conductance in each of the sectorial sections. Outer ends of the apertures are located at a rim of the stack elements or at a bridge of the rim. The apertures form channels through the stack in a direction of a rotational axis of the rotor. At least two of the apertures of a common channel of the channels have the outer ends at different radial distances from the rotational axis of the rotor.

9 Claims, 6 Drawing Sheets

(51) Int. Cl.
*H02K 1/08* (2006.01)
*H02K 15/02* (2006.01)

(58) Field of Classification Search
USPC .................................................. 310/156.57
See application file for complete search history.

(56) References Cited

U.S. PATENT DOCUMENTS

| | | | |
|---|---|---|---|
| 8,901,799 B2* | 12/2014 | Ikaheimo | H02K 1/246 310/216.113 |
| 2003/0020351 A1 | 1/2003 | Lee et al. | |
| 2005/0140238 A1 | 6/2005 | Yokochi et al. | |
| 2006/0043812 A1* | 3/2006 | Cheong | H01F 13/003 310/156.53 |
| 2012/0293038 A1 | 11/2012 | Ikaheimo et al. | |
| 2015/0162788 A1 | 6/2015 | Tsai et al. | |
| 2015/0372546 A1* | 12/2015 | Buttner | H02K 15/02 310/216.107 |
| 2015/0372577 A1* | 12/2015 | Haussmann | H02K 15/12 310/211 |

FOREIGN PATENT DOCUMENTS

| | | |
|---|---|---|
| CN | 102668331 A | 9/2012 |
| CN | 103117608 A | 5/2013 |
| DE | 102013206045 A1 | 10/2014 |
| EP | 0818870 A1 | 1/1998 |
| EP | 2325980 A1 | 5/2011 |
| JP | 2009027852 A | 2/2009 |
| TW | 201524086 A | 6/2015 |
| WO | 9840952 A1 | 9/1998 |

OTHER PUBLICATIONS

European Patent Office, International Preliminary Report on Patentability issued in corresponding Application No. PCT/EP2016/065569, dated Jan. 18, 2018, 13 pp.

Chinese Patent Office, Office Action issued in corresponding Application No. 201680062299.0, dated Sep. 3, 2019, 22 pp.

* cited by examiner

IM SLOT OF

ROTOR OF ELECTRIC MACHINE AND MANUFACTURING METHOD THEREOF

FIELD

The invention relates to a rotor of an electric machine and its manufacturing method.

BACKGROUND

In a direct-online synchronous reluctance motor (DOL SynRM) small air-gaps may be added between an outer rim of the rotor and a cage structure. This design allows the rotor to operate a little cooler during a variable speed drive (VSD) testing which supports the theory that small air-gaps prevent harmonics to flow through the cage during a steady state operation.

However, bridges through apertures of the stack elements result in loss on a power factor (PF) and complicate the mask plate structure. For an induction motor (IM), the losses caused by the VSD harmonics, which are harmonic electric currents flowing at the top parts of the rotor, are a well-known phenomenon which wastes energy and rises the temperature of the rotor. Hence, there is a need to improve the rotor.

BRIEF DESCRIPTION

The present invention seeks to provide an improvement associated with the rotor. According to an aspect of the present invention, there is provided a rotor of an electric machine as specified in claim 1.

According to another aspect of the present invention, there is provided a method of manufacturing a rotor of an electric machine in claim 11.

The invention has advantages. An electromagnetic response of the rotor can be made more efficient which may be used to improve energy efficiency and also potentially lower the temperature of the rotor.

LIST OF DRAWINGS

Example embodiments of the present invention are described below, by way of example only, with reference to the accompanying drawings, in which FIG. 1 illustrates an example of a sectorial section of a stack element;

DESCRIPTION OF EMBODIMENTS

Figure 1:
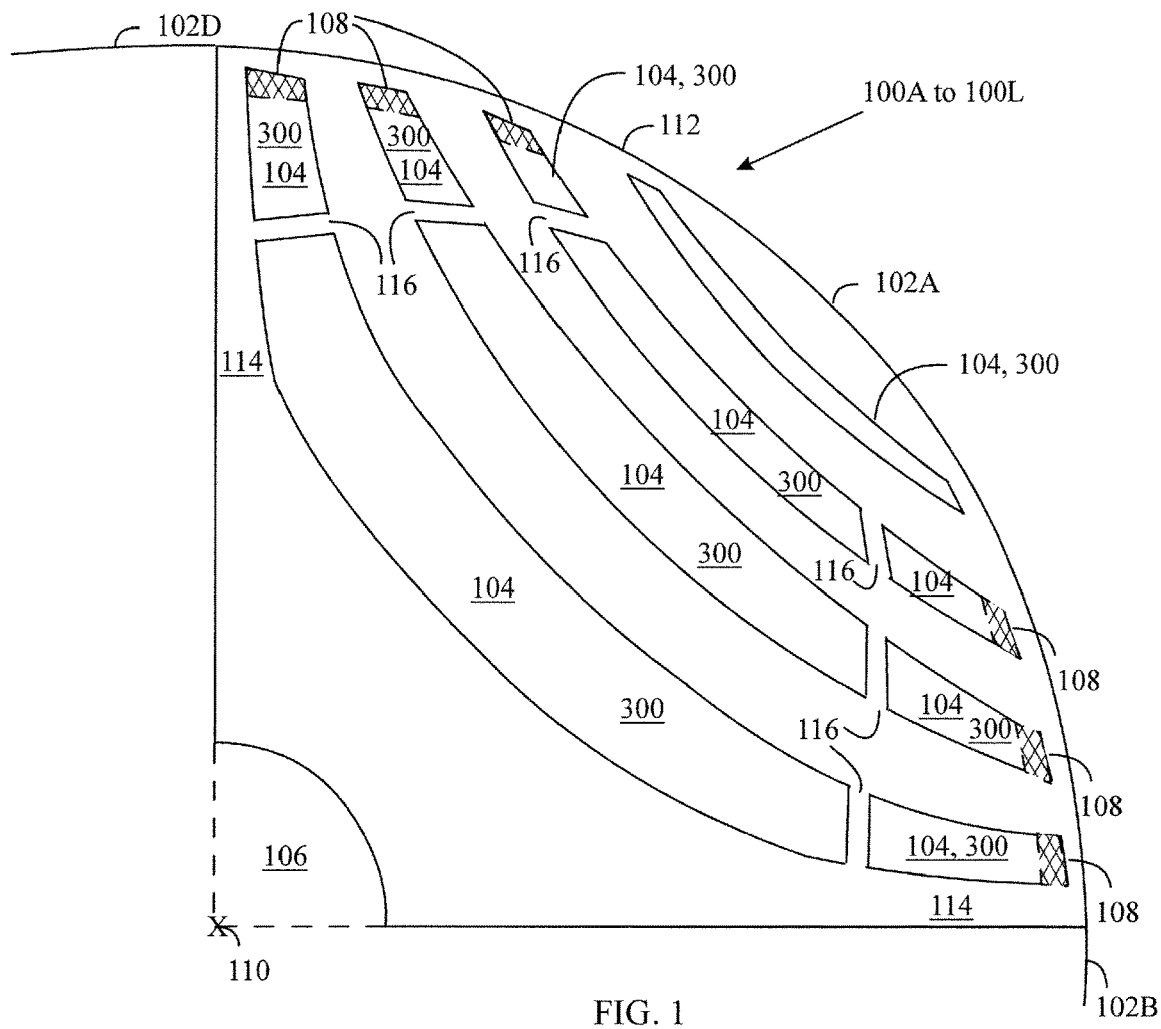

The following embodiments are only examples. Although the specification may refer to "an" embodiment in several locations, this does not necessarily mean that each such reference is to the same embodiment(s), or that the feature only applies to a single embodiment. Single features of different embodiments may also be combined to provide other embodiments. Furthermore, words "comprising" and "including" should be understood as not limiting the described embodiments to consist of only those features that have been mentioned and such embodiments may contain also features/structures that have not been specifically mentioned.

It should be noted that while Figures illustrate various embodiments, they are simplified diagrams that only show some structures and/or functional entities. It is apparent to a person skilled in the art that the described apparatus may also comprise other functions and structures than those described in Figures and text. It should be appreciated that details of some functions, structures are irrelevant to the actual invention. Therefore, they need not be discussed in more detail here.

Novel features can be used for DOL SynRM, IM and classic SynRM. The following novel features are applicable to the DOL SynRM technology: bridgeless design on outer rim of the rotor to allow harmonic protection on steady state with axially sparse rotor stack in key areas; simplified mask plate design without compromising an additional path to stray flux to flow through end area outer rim; and possibility to slim down the outer rim bridge on machining phase of casted rotor. The adjective sparse is used here to refer to a lower density of material at the outer surface of the rotor. The sparse structure at or near the rim can be made by varying the distance up to which the stack elements extend in the radial direction.

The following novel features are applicable to the IM technology: harmonic protection on radially top parts of the cage slot during VSD use; eccentric shaft hole to create sparse sheet lamination; and possibility to use traditional or simplified slot for traction as VSD harmonic protection is achieved through the sparse sheet structure.

The following novel features are applicable to the classic SynRM: sparse sheet structure to lower stacking factor of outer rim bridge by utilizing sections of geometry without outer rim bridges at all; and the motor may be made with better electrical performance and with the same structural strength or the motor may be made with same electrical performance but with increased structural strength by increasing thickness of outer rim but reducing its effect by lowering the average density.

The basic idea in this application is simple and straight forward: utilize axially sparse stack sections to reduce flux flow through that area and/or in many cases with a casted cage. Reduction of harmonic currents may thus be achieved. It is question of a skin effect and it may also be analysed using the theory of skin effect.

Figure 3:
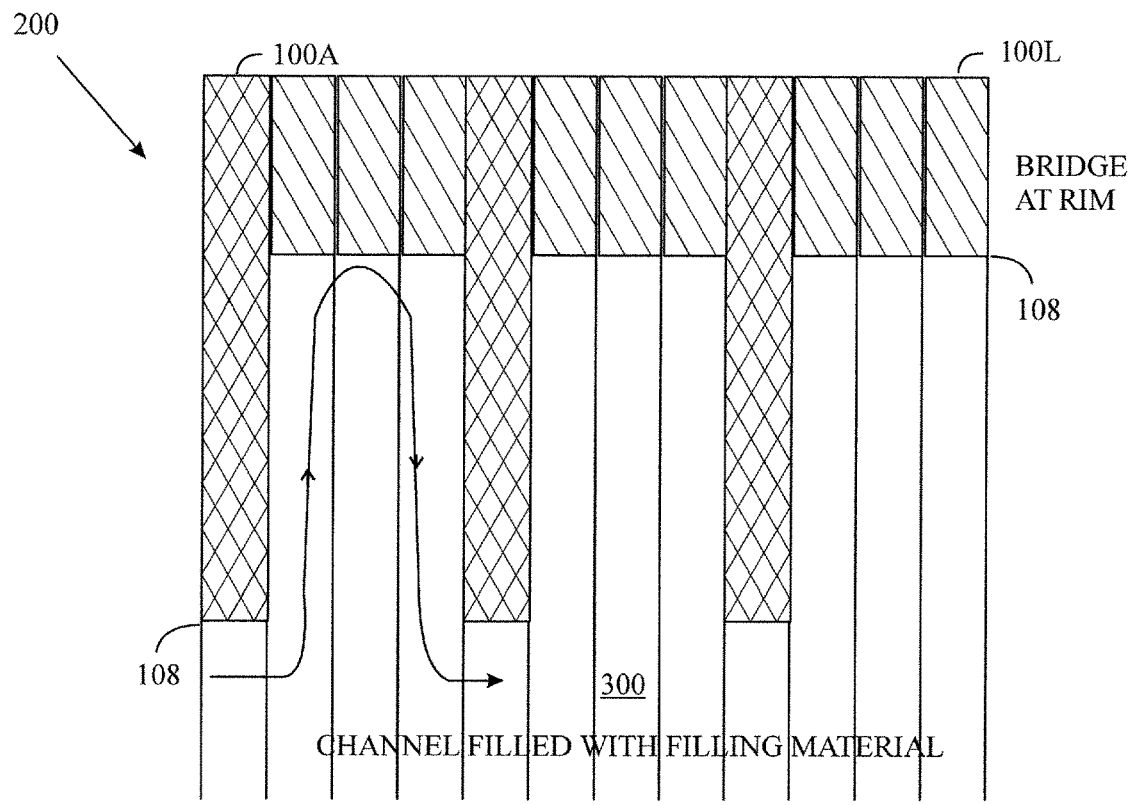
FIG. 3 illustrates an example of a stack of a rotor with bridges at the rim.
Figure 4:
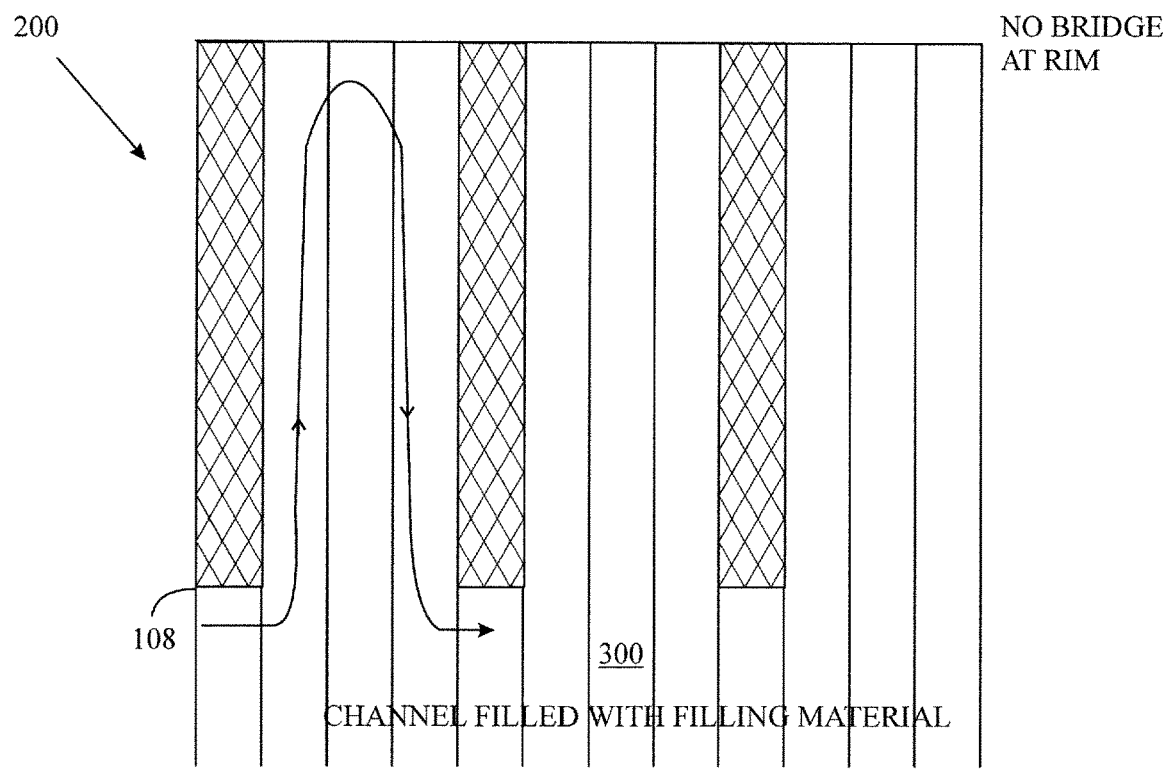
FIG. 4 illustrates an example of a stack of a rotor without bridges at the rim.

The following goes through those features in more detail. FIG. 1 illustrates an example of a quarter of a stack element 100 of a rotor of an electric machine which may be an electric motor or an electric generator. It is a known fact that the electric motor may be used as the electric generator and vice versa. FIGS. 3 and 4 illustrate a stack 200 of the rotor. The stack 200 of the rotor comprises a plurality of stack elements 100A to 100L. The stack elements may also be called sheets. The stack elements 100A to 100L comprise material of first magnetic conductance. The stack element 100A to 100L may be at least approximately a round plate. The material of the stack element 100A to 100L may be electrical steel, for example.

Figure 2:
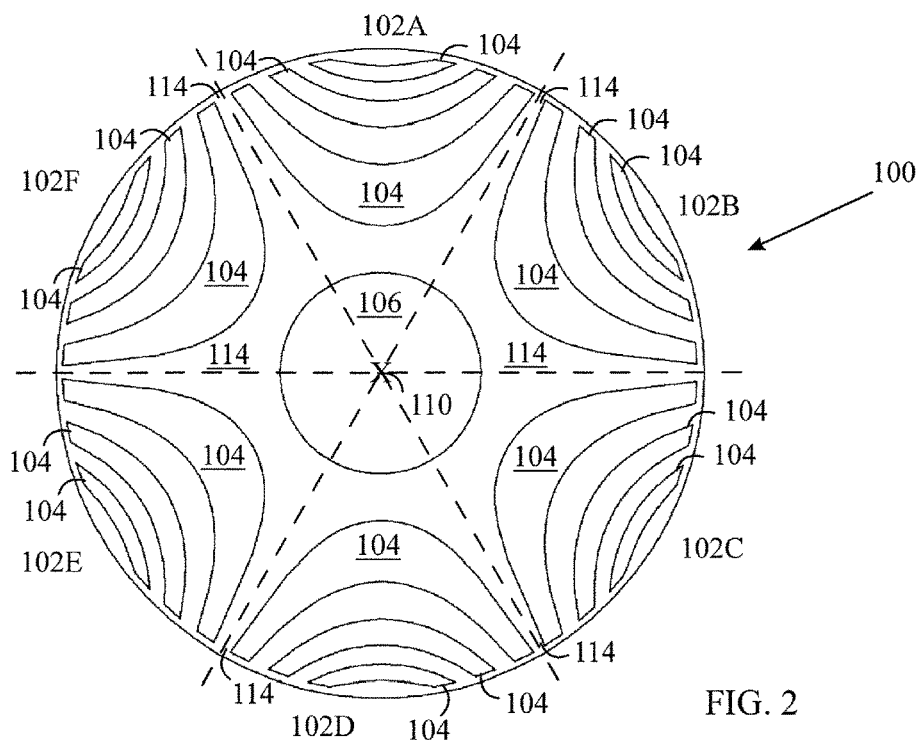
FIG. 2 illustrates an example of a six-pole stack element.

The rotor comprises a plurality of sectorial sections 102A to 102F distributed round an axis 110 of revolution of the rotor. FIG. 2 illustrates a six-pole rotor which has six sectorial sections 102A to 102F. A four-pole rotor may have four sectorial sections 102A to 102D. In general, there may be one or more sectorial sections per a pole. A shaft hole 106 is in the middle or approximately in the middle of each of the stack elements 100A to 100L.

Each of the stack elements 100 has a plurality of apertures 104 in each of the sectorial sections 102A to 102F. The apertures 104 may be continuous hollows in the stack element material or the apertures 104 may be discontinuous hollows by having one or more bridges 116 along the length of the apertures 104. The apertures 104 may be filled with a material different form that of the stack element 104. The material filling the aperture 104 may be aluminum, for example. Still, the filled aperture 104 acts effectively as a hole with respect to the magnetic field. The plurality of apertures 104 with or without filling provides an electromagnetic response in the rotor for an operation of the motor or the generator. The apertures 104 have second magnetic conductance. The electromagnetic response is based on a magnetic conductance difference between the first magnetic conductance and the second magnetic conductance. The apertures 104 with or without filling are magnetic flux barriers.

The plurality of the apertures 104 of the plurality of the stack elements 100A to 100L form a plurality of channels 300 (see also FIGS. 3 and 4) through the stack 200 in a direction of a rotational axis 110 of the rotor. The channels 300 may be curved, straight or tilted with respect to the rotational axis 110 of the rotor.

Outer ends 108 of the apertures 104 are located at a rim 112 of the stack elements 100A to 100L or at a bridge of the rim 112. When the ends of the apertures 104 are at the rim 112 that means that the aperture 104 is radially open and there is no bridge at the rim 112 (see FIG. 5). That is, the outer ends 108 are at or close to an air gap of the rotor. The air gap is between the rotor and the stator such that the rotor can rotate freely.

At least two of the apertures 104 of a common channel of the plurality of the channels 300 have the outer ends 108 at different radial distances from the rotational axis 110 of the rotor. The channels 300 may be hollows or cavities. The channels 300 may be pits or indentations.

A plurality of continuous material corridors 114 extend radially over the stack element 100A to 100L between a rim 112 and the shaft hole 106. Each of the continuous material corridors 114 is between two apertures 104 of different sectorial sections 102A to 102F.

Two directly adjacent sectorial sectors 102A to 102F are separated from each other by the continuous material corridor 114. The number of the sectorial sectors 102A to 102F may be the same as a number of poles of the electric motor or the generator.

FIG. 3 illustrates an example of the DOL SynRM rotor which has bridges (hatched) at the rim of the rotor to form an air-gap area shielding for protecting the rotor from the harmonic content produced by the stator winding and geometry. That is, there are bridges at the rim. In an embodiment, every quadrant of the four-pole rotor with geometry having the whole air-gap area covered by the material of the stack element i.e. electrical steel, for example. In that way, a sparse stack may be formed. The sparse stack area is below the hatching in FIGS. 3 and 4 because the channel 300 has radial distance variation from the rotational axis 100. The channel 300 may be filled with filling material such as aluminum. When all stack elements 100A to 100L are identical, and one sectorial section has one or more apertures the outer end 108 of which extends deeper or alternatively higher in the radial direction than that of the apertures in the other sectorial sections, it is possible to have this kind of a rotor by rotating a next stack element with respect to a directly previous stack element by 90°. In general, a next stack element may be rotated with respect to a directly previous stack element by 360°/N when there are N sectorial sections in the stack elements 100A to 100L.

FIG. 4 illustrates an example where every fourth stack element has a bridge at the rim 112. Also this kind of a rotor may be realized by rotating a next stack element with respect to a directly previous stack element by 360°/N. In FIG. 4, each stack element 100A to 100L has been rotated by 90° with respect to a directly previous stack element. Every $M^{th}$ stack element may be turned backside forth, where M is an integer larger than one. That may be desirable if all stack elements are similar. However, such turns may be done also when the stack elements differ from each other.

In an embodiment which is illustrated in FIGS. 3 and 4, every fourth of the apertures 104 of each of the stack elements 100A to 100L may have the outer ends 108 at different radial distances from the rotational axis 106 of the rotor.

In an embodiment which is illustrated in FIGS. 3 and 4, the outer ends 108 of at least two of the apertures 104 of any common channel of the plurality of the channels 300 may have different radial distances from the rotational axis 110 of the rotor.

In an embodiment which leads to the situation shown in FIGS. 3 and 4, at least two of the apertures 104 of any common channel may be of different length in a radial direction of the rotor for the outer ends 108 to be at different radial distances from the rotational axis 110 of the rotor.

Basically the skin theory defines that a "grooved" conducting metal will prevent certain frequency AC-currents to flow in its surface. High-frequency AC-currents have to make a curve and go back and forth between the stack elements having the outer ends 108 of the apertures 104 closer to the rotational axis 110.

The skin depth of 4 kHz harmonic current, which is a typical frequency, is around 1.33 mm. In order to travel the path (curved line with arrows) drawn in FIGS. 3 and 4, the axial width of the path should be at least two times the skin depth i.e. 5.32 mm. Otherwise the resistance seen by the high-frequency current is very high. The gap shown in FIGS. 3 and 4 is three times a thickness of a stack element, i.e. typically only 1.5 mm. That is why the 4 kHz current cannot in practice flow. But also the radial depth may be considered. If the skin depth of the harmonic current is bigger than radial depth of the "grooves", i.e. a difference in distance between the outer ends 108 of the apertures 104 which have the outer end 108 closer to the rotational axis 106 than the other stack elements, the current will flow under the grooving freely with no effect on resistance. But with these two parameters, i.e. the axial widths and the radial distances, it is actually possible to quite well fine tune the harmonic content allowed into the rotor cage. Effects on the electrical performance are similar to the small air-gap with bridges. It is even possible to control the harmonic number which is prevented from entering into the cage. Thus, the disturbance caused by the AC-current is cancelled or reduced.

In an embodiment, one or more of the stack elements 100A to 100L may have eccentric shaft holes 106 for the outer ends 108 of the apertures 104 to be at the different radial distances from the rotational axis 110. The eccentric shaft hole may mean the shaft hole has its rotational axis displaced from the center of the stack element. When the stack element 100A to 100L is rotated, its rim moves back and forth in the radial direction.

When the shaft holes are eccentric, at least two of the stack elements 100A to 100F may have shaft holes 106 geometric centers of which deviate from each other. Then at least two of the apertures 104 of the common channel of the plurality of the channels 300 have the outer ends 108 at different radial distances from the rotational axis 106 of the rotor. The eccentric shaft holes may be applied to induction motors or generators, for example.

The shaft hole 106 of the rotor may thus be asymmetric so that, when the stack element is turned, the aperture 104 and its outer end 108 is moved radially outward or inwards for realizing the sparse outer surface of the rotor.

In an embodiment, every fourth sectorial section 102A to 102D of a four-pole rotor may have the rim 112 closer to the rotational axis 106 than the other sectorial sections. Then each stack element is made to have 90° rotational angle with respect to directly adjacent stack element. The rotational angle may be a monotonic function with respect to a position of the stack element in the stack 200. That is, if one stack element is taken as a reference, the rotational angle of a stack element increases as a function of a distance from the reference in a direction parallel to the rotational axis 106. This is also applicable to the induction motor or generator, for example.

Figure 5:
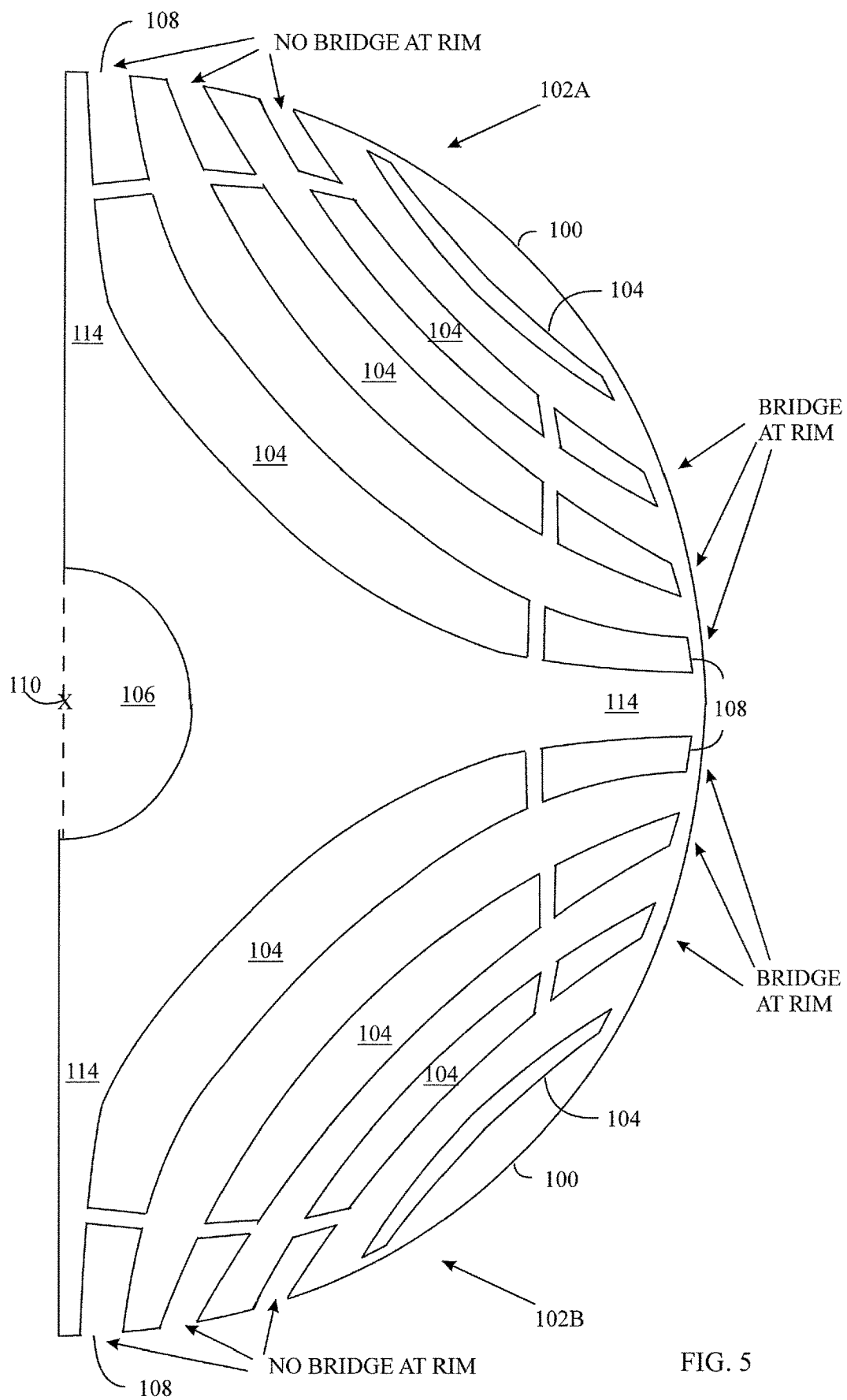
FIG. 5 illustrates an example of a stack element without bridges in a half of a sectorial section and with bridges in another half of the sectorial section.

In an embodiment an example of which is illustrated in FIG. 5, at least one of apertures 104 of the stack elements 100A to 100L may be bridgeless at the outer end 108 while the aperture(s) in at least one other sectorial section has a bridge. As to the classic SynRM, the outer rim may be removed from some sectorial sections in this manner which would decrease the leakage flux over the bridge at the rim of the rotor and improve a power factor of the electric motor or generator. The bridge at the rim is thus not removed all together but its presence is made a little bit mellower. That is, in some sectorial section a part of the stack elements have the bridge and the rest of the stack elements don't have the bridge. In an embodiment, one end of the flux barrier may have a bridge at the rim while another end of the same flux barrier may have no bridge at the rim. A sparse outer surface of the rotor is not seen so ideal path by the magnetic flux, and that is why the power factor increases as more magnetic flux is forced through the flux paths between the flux barriers.

A stack element of a four-pole machine may have 4 sectorial sections like the sectorial section 102 presented in FIG. 5. In the stack 200 of the rotor, a stack element may be inverted front side back in a determined or random manner so that both sides of each pole have open apertures (no bridge) sometimes. For example, every second stack element may be inverted. It is also possible that every fourth stack element is turned front side back. The idea is to have both open and closed parts of the rim in each half of the sectorial sections. The key of this idea is to utilize axial notches which will prevent the open structures to open like a door. The stack 200 of the rotor may be quite thin as the more weight is added to the notches, the more likely it is to fail as all of the force is on the notches and only very little on friction between the stack elements.

The structural strength of the rotor can in this manner increased. If the bridges of the outer rim in the other side of the pole (see FIG. 5) is thickened by factor 1.5-2, for example, it is possible increase the structural strength with the sparse rim of the rotor while having the same electrical performance as the original design. This increased strength may give a change to create a 3000 rpm SynRM motor or generator for applications of a higher speed.

The effect on the electrical performance should be negligible as long as material of the sectorial section 102A to 102F is not reduced too much such that it would also start to affect the resistance seen by fundamental frequency current. The fundamental frequency may be in a range 25 Hz to 133 Hz, for example, without restricting to the frequency range.

Figure 6:
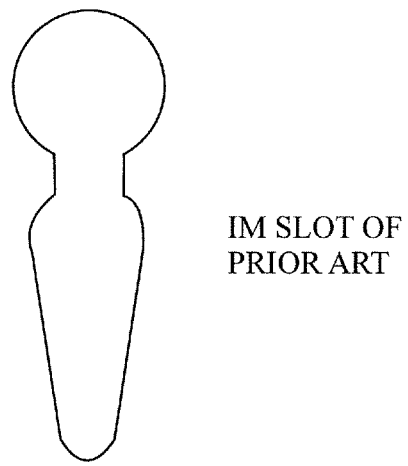
FIG. 6 illustrates an example of a prior art aperture slot of a rotor of an induction motor.
Figure 7:
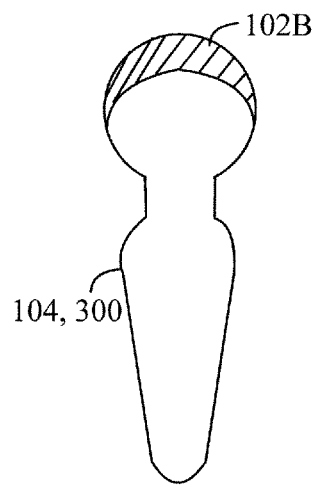
FIG. 7 illustrates an example of different sized apertures of a rotor of the induction motor.
Figure 8:
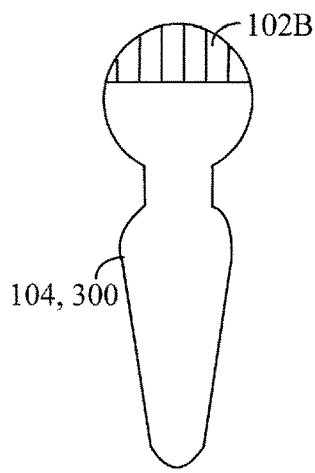
FIG. 8 illustrates another example of different sized apertures of a rotor of the induction motor.
Figure 9:
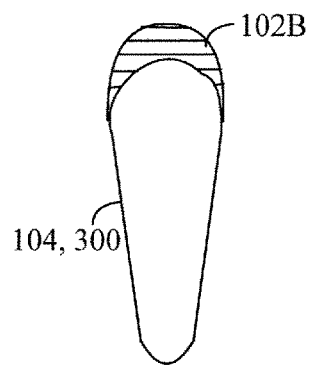
FIG. 9 illustrates an example of different sized apertures of tracking slots.

The basic solution can also be utilized in a high-speed traction slot or aperture as the current slot structure is quite complex. FIG. 6 illustrates the aperture of the IM slot of the prior art. The new kind of aperture also has shielding over the harmonic currents from VSD use with simpler overall design. FIG. 7 illustrates an example of the new IM aperture 100A with a sparse structure at the outer rim 112 of the rotor. The hatched part refers to material of the stack element 102B behind seen through the aperture 104 of the stack element 100 in the front. The apertures 104 of the stack element in the front and the stack element behind are partially overlapping. FIG. 8 illustrates another example of the new IM aperture with a sparse structure at the outer surface of the rotor. In a similar manner, the hatched part refers to material of the stack element 102B behind seen through the aperture 104 of the stack element 102A in the front. FIG. 9 illustrates an example of a new aperture for a traction slot. Still in a similar manner, the hatched part refers to material of the stack element 102B behind seen through the aperture 104 of the stack element 102A in the front.

Figure 11:
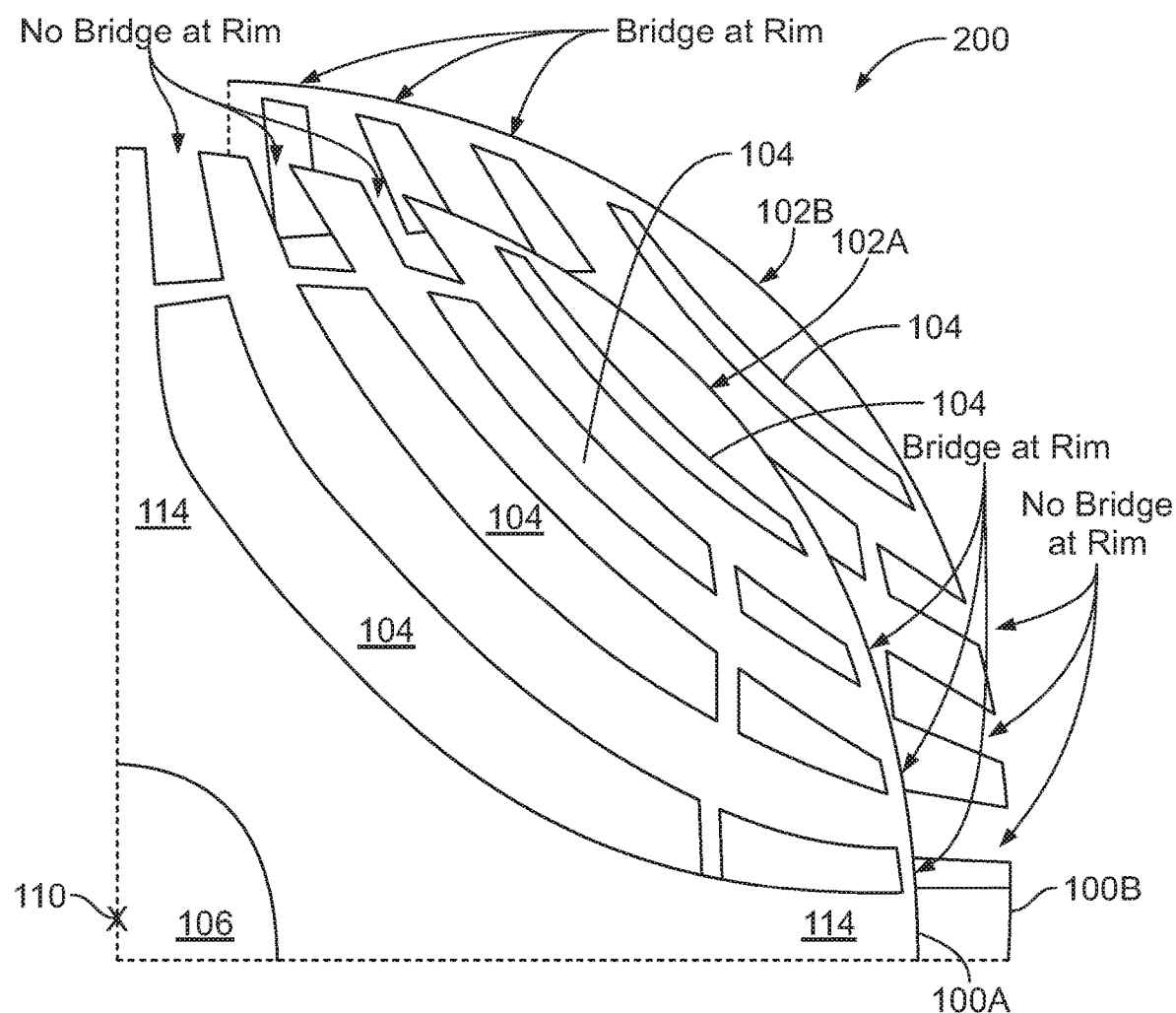
FIG. 11 illustrates an example of two stack elements rotated relative to each other.

In embodiment of FIG. 11, any two of the stack elements 100A to 100L, which are directly adjacent to each other in the stack 200 and which are identical, may be rotationally shifted with each other by an angle between two of said sectional sections 102A to 102F which are directly adjacent.

In an embodiment, the channels 300 comprise solid material of the second magnetic conductance.

Figure 10:
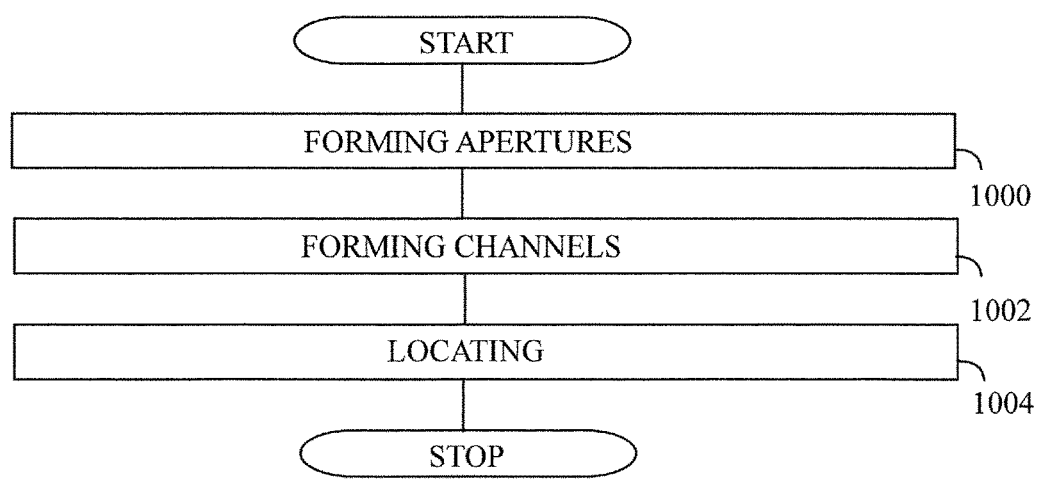
FIG. 10 illustrates of an example of a flow chart of a manufacturing method.

FIG. 10 is a flow chart of the measurement method. In step 1000, a plurality of apertures 104 are formed in each of stack elements 100A to 100L of a stack 200 of the rotor in sectorial sections 102A to 102F distributed round a rotational axis 110 of the rotor, for providing by the plurality of apertures 104 an electromagnetic response in the rotor for an operation of the motor or generator. In step 1002, a plurality of channels 300 through the stack 200 in a direction of a rotational axis of the rotor are formed by the plurality of the apertures 102A to 102F of the plurality of the stack elements 100A to 100L. In step 1004, outer ends 108 of at least two of the apertures 104 of a common channel of the plurality of the channels 300 at different radial distances from the rotational axis 110 of the rotor at a rim 112 of the stack elements 100A to 100L or at a bridge of the rim 112.

The sparse structure at or near the outer surface of the rotor may be utilized in various places in order to achieve harmonic filtering structures or otherwise make necessary but electromagnetically harmful structures have smaller effect in rotors out of various technologies of motors or generators. For the DOL SynRM the benefits can be seen as lower rotor temperature rise without using bridges which require complex mask plates to be used in casting. This will simplify manufacturing process somewhat.

On the IM side, a sparse structure may be used to introduce harmonic filtering on cage slots. This may be useful for traction motors/generators and motors/generators heavily utilized as part of VSD package. Lower harmonic content in the cage will reduce temperature rise and torque total harmonic distortion (THD). Finally with the classic SynRM, a possibility to reduce the effective stacking factor of the outer rim will result in a lower amount of leakage flux passing through the outer rim which in turn will improve a power factor of the classic SynRM motor/generator.

It will be obvious to a person skilled in the art that, as technology advances, the inventive concept can be implemented in various ways. The invention and its embodiments are not limited to the example embodiments described above but may vary within the scope of the claims.

The invention claimed is:

1. A rotor of an electric machine, wherein a stack of the rotor comprises a plurality of stack elements which comprise material of first magnetic conductance;
   the rotor comprises a plurality of sectorial sections distributed round a rotational axis of the rotor;
   each of the stack elements has an aperture of second magnetic conductance in each of the sectorial sections;
   the apertures of the plurality of the stack elements are configured to form a plurality of channels through the stack in a direction of an rotational axis of the rotor;
   the apertures with or without filling configured to provide an electromagnetic response in the operating rotor, wherein outer ends of the apertures are located at a rim of the stack elements or at a bridge of the rim; and
   at least two of the apertures of a common channel of the plurality of the channels are of different sizes and configured to have the outer ends at different radial distances from the rotational axis of the rotor, and one end of an aperture of the apertures has a bridge at the rim and other end of said aperture of the apertures has no bridge at the rim.

2. The rotor of claim 1, wherein one or more of the stack elements are configured to have eccentric shaft holes for the outer ends to be at the different radial distances from the rotational axis.

3. The rotor of claim 1, wherein outer ends of at least two of the apertures of any common channel of the plurality of the channels have different radial distances from the rotational axis of the rotor.

4. The rotor of claim 1, wherein at least two of the stack elements have shaft holes geometric centers of which deviate from each other for at least two of the apertures of the common channel of the plurality of the channels to have the outer ends at different radial distances from the rotational axis of the rotor.

5. The rotor of claim 1, wherein every fourth stack element has the outer ends at different radial distances from the rotational axis of the rotor from those of other stack elements.

6. The rotor of claim 5, wherein any two of the stack elements, which are directly adjacent to each other in the stack and which are identical, are rotationally shifted with each other by an angle between two of said sectorial sections which are directly adjacent.

7. The rotor of claim 1, wherein the channels formed by the apertures of the stacked elements comprise solid material of the second magnetic conductance.

8. The rotor of claim 1, wherein the aperture is configured to provide an electromagnetic response in the rotor for an operation of the machine on the basis of a magnetic conductance difference between the first magnetic conductance and the second magnetic conductance.

9. A method of manufacturing a rotor of an electric machine, the method comprising
   forming, in each of stack elements of a stack of the rotor, a plurality of apertures in sectorial sections distributed round a rotational axis of the rotor, the apertures with or without filling providing an electromagnetic response in the operating rotor;
   forming, by the plurality of the apertures of the plurality of the stack elements, a plurality of channels through the stack in a direction of an rotational axis of the rotor; and
   locating outer ends of at least two of the apertures, which are of different sizes and of a common channel of the plurality of the channels, at different radial distances from the rotational axis of the rotor at a rim of the stack elements or at a bridge of the rim, and one end of an aperture of the apertures has a bridge at the rim and other end of said aperture of the apertures has no bridge at the rim.

* * * * *